United States Patent
Park et al.

(10) Patent No.: US 11,856,333 B2
(45) Date of Patent: Dec. 26, 2023

(54) SYSTEM FOR MONITORING BACK SEAT IN TRANSPORTER AND METHOD USING THE SAME

(71) Applicant: HYUNDAI MOBIS CO., LTD., Seoul (KR)

(72) Inventors: Ki Hee Park, Gwacheon-si (KR); Sung Sik Cho, Yongin-si (KR); June Seung Lee, Gunpo-si (KR); Yeong Hun Park, Seoul (KR); Hyun Jun Lim, Anyang-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 0 days.

(21) Appl. No.: 17/879,339

(22) Filed: Aug. 2, 2022

(65) Prior Publication Data

US 2023/0188681 A1 Jun. 15, 2023

(30) Foreign Application Priority Data

Dec. 9, 2021 (KR) ........................ 10-2021-0175580

(51) Int. Cl.
*H04N 7/18* (2006.01)
*G06V 20/59* (2022.01)
*H04N 23/69* (2023.01)

(52) U.S. Cl.
CPC ............. *H04N 7/183* (2013.01); *G06V 20/59* (2022.01); *H04N 23/69* (2023.01)

(58) Field of Classification Search
CPC .......... H04N 7/183; H04N 7/18; H04N 7/181; H04N 23/69; G06V 20/59
USPC .................. 348/115, 148; 345/7, 8; 340/461
See application file for complete search history.

(56) References Cited

U.S. PATENT DOCUMENTS

2017/0313248 A1* 11/2017 Kothari .................. H04N 23/69

* cited by examiner

*Primary Examiner* — Sherrie Hsia
(74) *Attorney, Agent, or Firm* — NSIP Law

(57) ABSTRACT

Disclosed are systems and a methods for monitoring a back seat in a transporter based on a head up display (HUD), the system a back seat display mounted on the back seat, and the HUD to display monitoring information selected by a user, image information filmed by a camera, and control information for an image displayed on the back seat display, and a processor configured to transmit and receive a control signal between the camera, the back seat display, and the HUD, and control zoom-in or zoom-out of a first area of the HUD where the monitoring information is displayed to not overlap a second area where driving control information is displayed, wherein the image information comprises an image content displayed on the back seat display, a reproduction time of the image content, and a number or a reproduction time of image contents after a point in time.

14 Claims, 8 Drawing Sheets

SYSTEM FOR MONITORING BACK SEAT IN TRANSPORTER AND METHOD USING THE SAME

CROSS REFERENCE TO RELATED APPLICATION(S)

This application claims the benefit under 35 USC § 119(a) of Korean Patent Application No. 10-2021-0175580, filed on Dec. 9, 2021, the entire disclosure of which is incorporated herein by reference for all purposes.

BACKGROUND

Field

The present disclosure relates to a system for monitoring a back seat in a transporter and a method using the same, and specifically, to a system designed to efficiently monitor a situation of the back seat in which infants sits in the transporter based on a head up display (HUD) and to interact with the monitored situation, and a method using the same.

Discussion of Related Art

When driving a vehicle with a child, parents are usually located in a driver's seat and a passenger seat, and the child is generally located in a back seat. When only one of the parents is in the driver's seat, there is a great demand for a function of identifying a behavior of the child in the back seat in real time while driving and controlling a content reproduced by the child.

Previous studies on the same have provided a function of displaying an occupant's state monitoring image on a display at a position of a center fascia of the vehicle. However, in such previous studies, there is a problem in that a driver is distracted as the image of the back seat occupant is displayed only on the display at the center fascia position, and it is necessary to improve a method for efficiently controlling the back seat occupant's image such that there is no problem in the driving.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, there is provided an apparatus for monitoring a back seat in a transporter, the apparatus including a camera and a back seat display mounted on the back seat of the transporter, a head up display (HUD) configured to display any one or any combination of monitoring information selected by a user from among image information displayed on the back seat display, image information filmed by the camera, and control information for an image displayed on the back seat display, and a processor configured to transmit and receive a control signal between the camera, the back seat display, and the HUD, and control zoom-in or zoom-out of a first area of the HUD where the monitoring information is displayed to not overlap a second area where driving control information is displayed by the HUD, wherein the image information displayed on the back seat display comprises any one or any combination of an image content displayed on the back seat display, a reproduction time of the image content, and a number or a reproduction time of image contents reproduced on the back seat display after a point in time.

The HUD may be an augmented reality HUD (AR-HUD), wherein a brightness and a color of the any one or any combination of monitoring information may be controlled to minimize an effect on monitoring of a front situation.

The processor may be configured to control the control information for the image displayed on the back seat display to be displayed on the HUD based on a preset criterion of the user, in response to the image displayed on the back seat display corresponding to a category, wherein the control information for the image displayed on the back seat display may include control information for identifying any one or any combination of reproduction, stop, and next content reproduction of an image content waiting to be displayed on the back seat display.

The processor may be configured to control a notification to be provided as the control information for the image displayed on the back seat display, in response to the number or the total reproduction time of image contents reproduced on the back seat display exceeds a threshold.

The image information filmed by the camera may include any one or any combination of determination result information based on a heart rate, a body temperature, and a posture of a back seat occupant along with an image of the back seat occupant.

The image information filmed by the camera may additionally contains image information of at least one of an object and a pet located in the back seat, wherein the processor may be configured to highlight an image area of the object or the pet recognized by the camera based on an input of the user.

The apparatus may include a voice sensor mounted on the back seat of the transporter, and a front camera mounted at a position to film an image of a driver of the transporter, wherein the processor may be configured to control the image of the driver to be displayed on the back seat display in response to a specific voice recognized by the voice sensor.

In another general aspect, there is provided a processor-implemented method for monitoring a back seat in a transporter, the method including acquiring, via a camera mounted on the back seat of the transporter, a back seat image containing a back seat occupant, displaying, on a head up display (HUD), any one or any combination of monitoring information selected by a user from among image information displayed on a back seat display mounted on the back seat of the transporter, the back seat image, and control information for an image displayed on the back seat display, and performing zoom-in or zoom-out of a first area where the monitoring information is displayed on the HUD to not overlap a second area where driving control information is displayed on the HUD, wherein the image information displayed on the back seat display comprises any one or any combination of an image content being displayed on the back seat display, a reproduction time of the image content, and a number or a reproduction time of image contents reproduced on the back seat display after a point in time.

The HUD may be an augmented reality HUD (AR-HUD), wherein a brightness and a color of the any one or any combination of monitoring information may be controlled to minimize an effect on monitoring of a front situation.

The method may include controlling the control information for the image displayed on the back seat display to be displayed on the HUD, in response to the image displayed on the back seat display corresponding to a category specified by the user, wherein the control information for the image displayed on the back seat display may include control information for identifying any one or any combination of reproduction, stop, and next content reproduction of an image content waiting to be displayed on the back seat display.

The method may include providing a notification as the control information for the image displayed on the back seat display, in response to the number or the total reproduction time of image contents reproduced on the back seat display exceeding a threshold specified by the user.

The image information filmed by the camera may include any one or any combination of determination result information based on a heart rate, a body temperature, and a posture of the back seat occupant along with an image of the back seat occupant.

The image information filmed by the camera may additionally contain image information of at least one of an object and a pet located in the back seat, the method may include highlighting an image area of the object or the pet recognized by the camera based on an input of the user.

The method may include displaying an image of a driver on the back seat display in response to a voice being recognized by a voice sensor mounted on the back seat of the transporter.

Other features and aspects will be apparent from the following detailed description, the drawings, and the claims.

Figure 1:
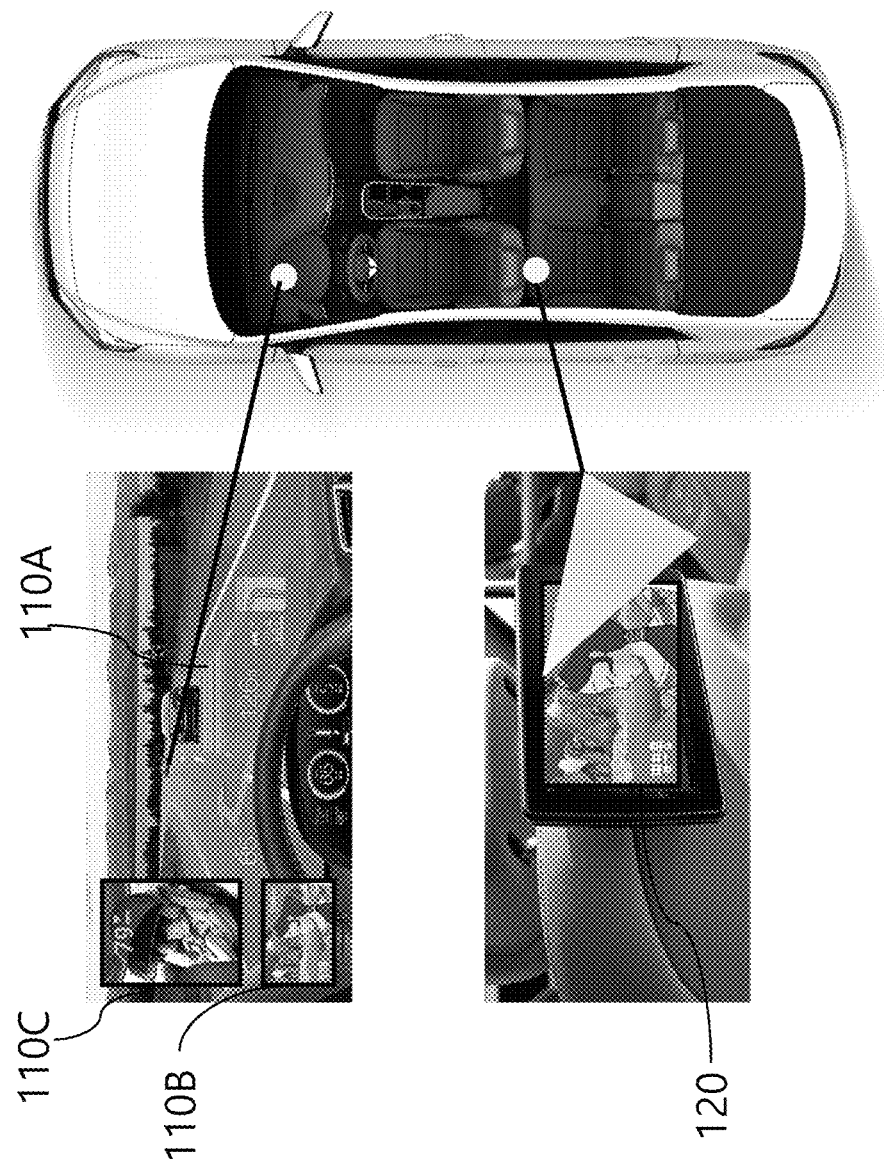
FIGS. 1 and 2 are diagrams for illustrating a concept of a HUD-based back seat monitoring system according to an embodiment of the present disclosure.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order.

The features described herein may be embodied in different forms and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Throughout the specification, when a component "includes" a certain component, it means that other elements may be further included, rather than excluding other components, unless otherwise stated.

In addition, a 'transporter' used in the following description assumes a vehicle used for transport of an occupant, but is not limited thereto. The 'transporter' may include all of an urban air mobility (UAM), a bus, and the like.

Figure 2:
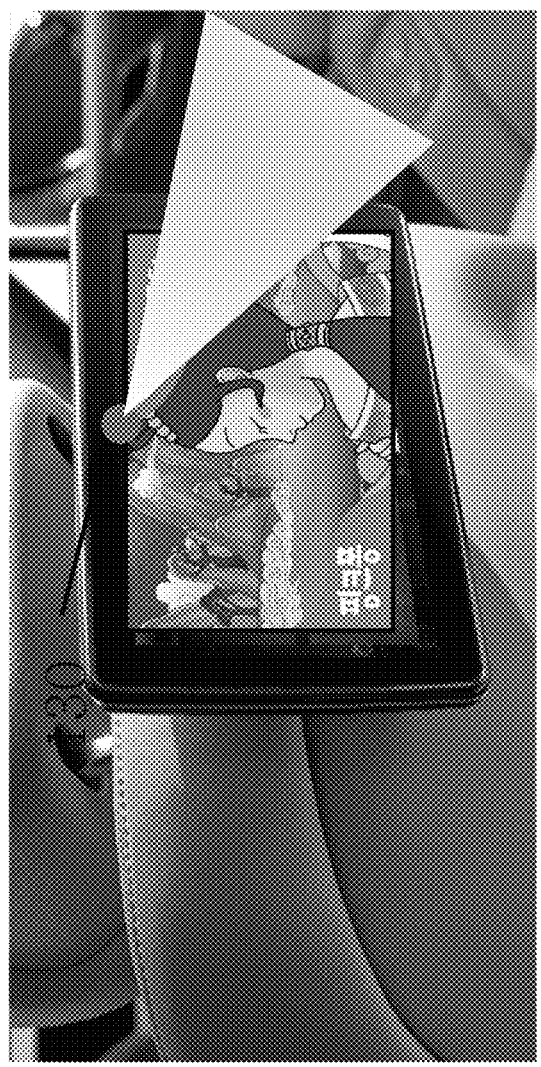

FIGS. 1 and 2 are diagrams for illustrating a concept of a HUD-based back seat monitoring system according to an embodiment of the present disclosure.

First, an in-transporter back seat monitoring system according to an embodiment shown in FIG. 1 includes a camera and a back seat display 120 mounted on a back seat of a transporter. As shown in FIG. 2, a camera 130 may be integrally mounted on the back seat display 120, but the present disclosure may not be necessarily limited thereto. The camera 130 may be installed at various positions in the back seat where a state of a monitoring target may be filmed.

In addition, the back seat monitoring system according to the present embodiment includes a HUD that displays at least one monitoring information selected by a user among image information 110B displayed on the back seat display 120 described above, image information 110C (e.g., an image showing a behavior of an infant in a back seat) filmed by the camera described above, and control information on the image displayed on the back seat display (not shown; e.g., information for realizing a control function for reproduction and stop of the corresponding image and next content reproduction). It is preferable that the HUD has a form of an AR-HUD in which control information 110A related to travel is displayed with minimum obstruction of a view in an actual front situation, but the present disclosure is not limited thereto.

As shown in FIG. 1, as the HUD, preferably the AR-HUD, rather than a display located at a center fascia is utilized for the back seat monitoring, obstruction of a view of a parent who is a driver during the travel may be minimized and the control may be performed in an efficient manner.

Figure 3:
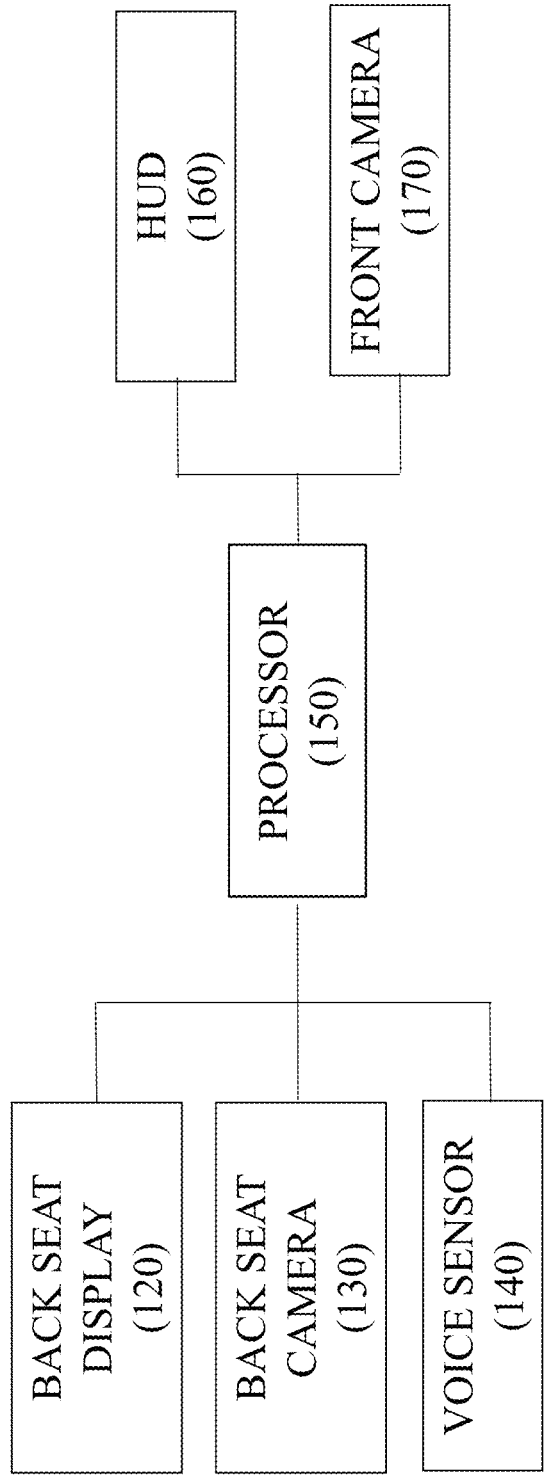
FIG. 3 is a diagram for illustrating a configuration of a HUD-based back seat monitoring system according to an embodiment of the present disclosure.

FIG. 3 is a diagram for illustrating a configuration of a HUD-based back seat monitoring system according to an embodiment of the present disclosure.

As described above in relation to FIGS. 1 and 2, the in-transporter back seat monitoring system according to the present embodiment includes the back seat display 120 and the back seat camera 130 on the back seat to allow a state of the occupant such as the infants in the back seat and a content being reproduced to be identified. In addition, in one preferred embodiment, in addition to the back seat display 120 and the back seat camera 130 described above, a (back seat) voice sensor 140 is additionally included for communication with the driver via voice recognition of the occupant such as the infants located in the back seat.

In one example, a HUD 160 is disposed on a front face of the transporter as described above to allow the at least one monitoring information selected by the user among the image information displayed on the back seat display 120, the image information filmed by the back seat camera 130, and the control information on the image displayed on the back seat display 120 to be displayed. In addition, in a preferred embodiment of the present disclosure, a front camera 170 is additionally disposed to provide means to communicate with the driver based on the voice recognition of the occupant such as the infants located in the back seat. This will be described later in detail with reference to FIG. 6.

In one example, the back seat camera 130, the back seat display 120, the voice sensor 140, the HUD 160, and the front camera 170 described above may be connected to a processor 150 and operate in response to a control signal of the processor 150.

Figure 4:
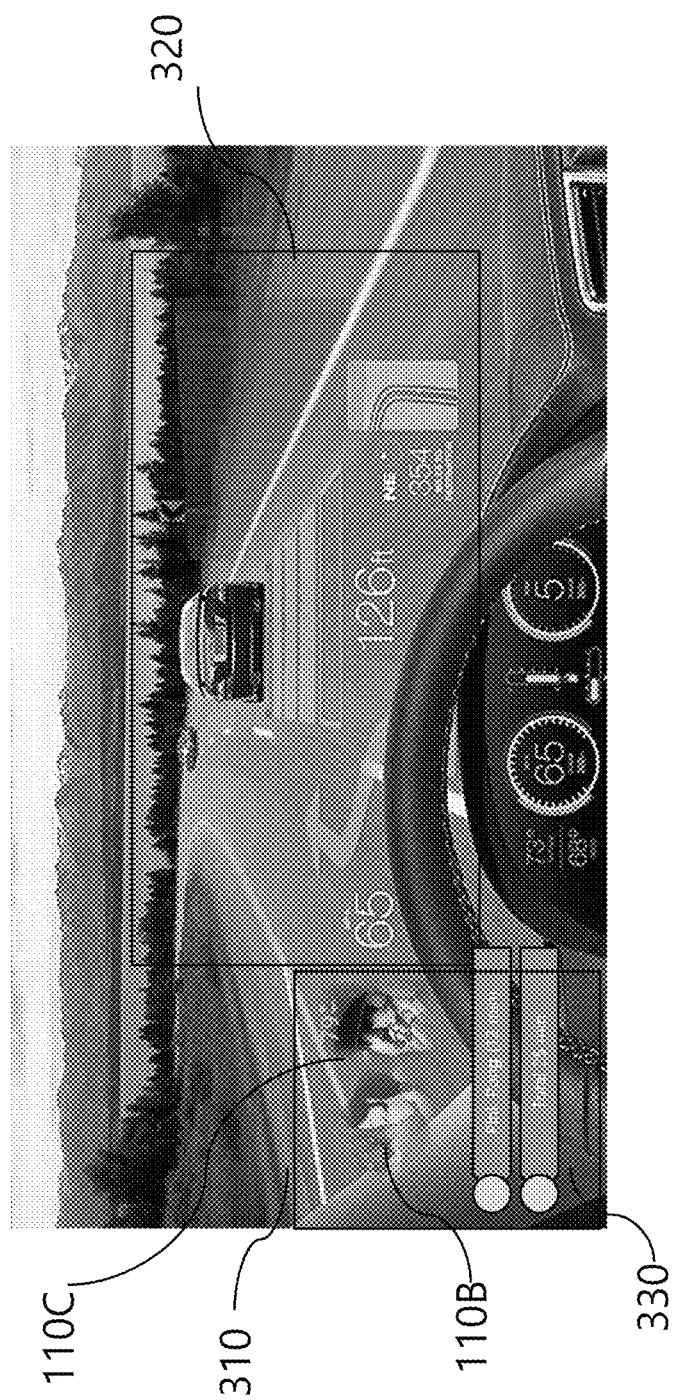
FIG. 4 is a diagram for illustrating a scheme for a processor to control HUD display information according to an embodiment of the present disclosure.

FIG. 4 is a diagram for illustrating a scheme for a processor to control HUD display information according to an embodiment of the present disclosure.

As shown in FIG. 4, the processor may display, as information displayed by the HUD, a combination of the image content 110B displayed by the back seat display, the state image 110C of the back seat occupant secured by the back seat camera, information 330 on the image content displayed by the display, and the like based on the selection of the user. It is desirable to control a first area 310 in which such monitoring information is displayed not to overlap with a second area 320 in which driving control information displayed by the HUD is displayed.

In the first area 310 in which the monitoring information is displayed, the processor may freely zoom in and out based on the user's selection, but such zoom in/zoom out control is performed within a range that does not overlap with the second area 320. Preferably, the first area 310 may be located at a lower left end of the driver's seat as in an example shown in FIG. 4, but the present disclosure may not be necessarily limited thereto.

In addition, the image content 110B displayed by the back seat display, the state image 110C of the back seat occupant secured by the back seat camera, and the like displayed by the AR-HUD are not for viewing the behavior of the occupant in high quality, but for the monitoring, so that it is preferable that the images are displayed with a level of brightness/color similar to that of another driving control information 320 displayed via the AR-HUD while minimizing the obstruction of the view while driving. A brightness/color/size/position of the image content 110B displayed by the back seat display, the state image 110C of the back seat occupant secured by the back seat camera, and the like displayed by the AR-HUD may be adjusted in advance by the user's selection.

In addition, the information 330 on the image content displayed by the display may contain at least one of a reproduction time of the image content and the number or a total reproduction time of image contents reproduced on the back seat display after a specific time point (e.g., after start traveling), as illustrated in FIG. 4.

In addition, the image information 110C filmed by the back seat camera may contain at least one of determination result information based on a heart rate, a body temperature, and a posture of the back seat occupant along with the image of the back seat occupant.

Figure 5:
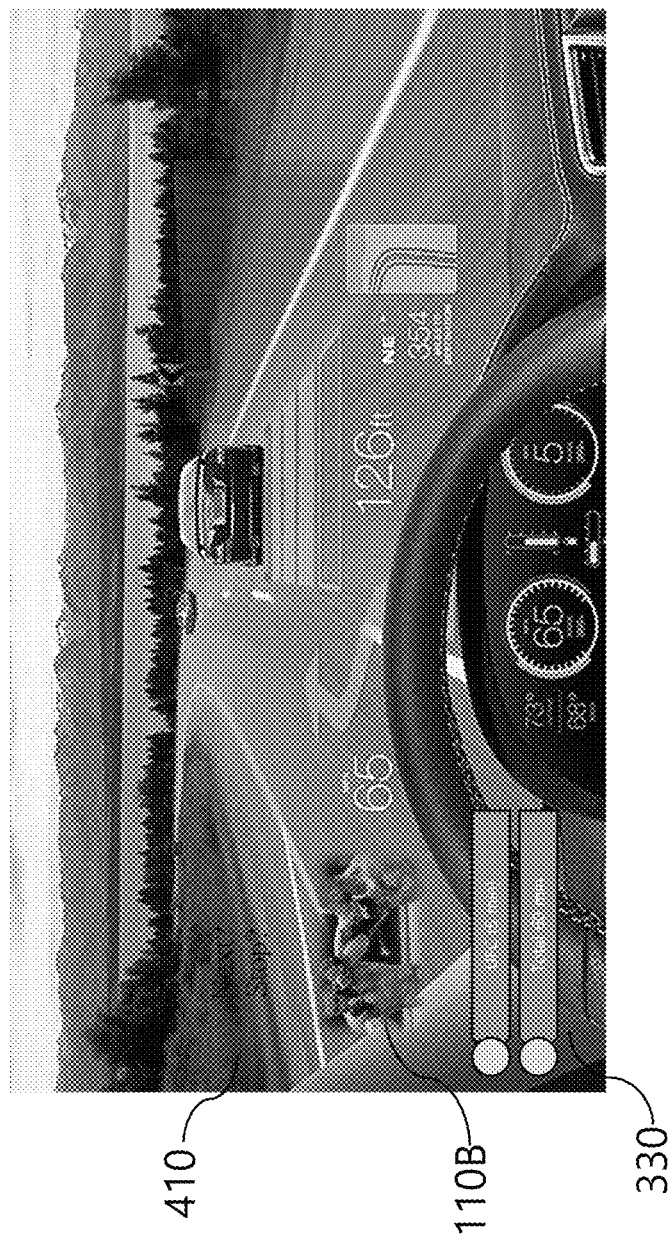
FIG. 5 is a diagram for illustrating a method for controlling an image content reproduced by a back seat display according to an embodiment of the present disclosure.

FIG. 5 is a diagram for illustrating a method for controlling an image content reproduced by a back seat display according to an embodiment of the present disclosure.

In the present embodiment, it is suggested to automatically warn the driver and activate a control function based on presetting of the user when the image displayed on the back seat display corresponds to a specific category. For example, as shown in FIG. 5, when it is recognized that a content 110B inappropriate for the infants is reproduced on the back seat display while the infant is in the back seat or when a total image watching time or the number of image watching 330 exceeds a preset criterion, the system according to the present embodiment may be set to automatically provide a notification (e.g., screen display or voice notification) to the driver and display control information 410 for the image displayed on the back seat display.

The control information 410 at this time may be control information for identifying at least one of reproduction, stop, and next content reproduction of an image content waiting to be displayed on the back seat display. Although the control information 410 displayed on the HUD is assumed in FIG. 5, but the present disclosure is not necessarily limited thereto. The control information 410 may be implemented via an interface of the voice notification/voice command.

Figure 6:
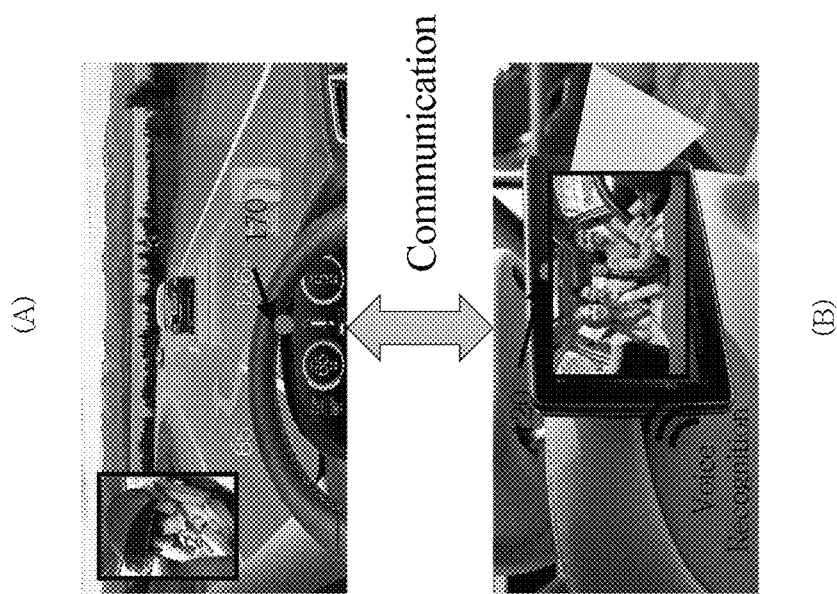
FIG. 6 is a diagram for illustrating a method for efficiently communicating with a driver based on voice recognition of a back seat occupant according to an embodiment of the present disclosure.

FIG. 6 is a diagram for illustrating a method for efficiently communicating with a driver based on voice recognition of a back seat occupant according to an embodiment of the present disclosure.

As described above in relation to FIG. 3, the back seat monitoring system according to the present embodiment may additionally include the voice sensor 140 mounted on the back seat of the transporter, and the front camera 170 that is mounted at a position where the image of the driver of the transporter may be filmed. Therefore, in response to a specific voice (e.g., Thom' and 'dad') of the back seat occupant recognized by the voice sensor 140, as shown in (b) in FIG. 6, it may be controlled that the driver's image is displayed on the back seat display 120.

Because an image of the infant in the back seat is displayed via the HUD ((A) in FIG. 6), the image of the driver may be displayed on the back seat display 120 for the back seat occupant, so that the driver and the infant may communicate with each other while identifying a behavior of each other during the driving.

Figure 7:
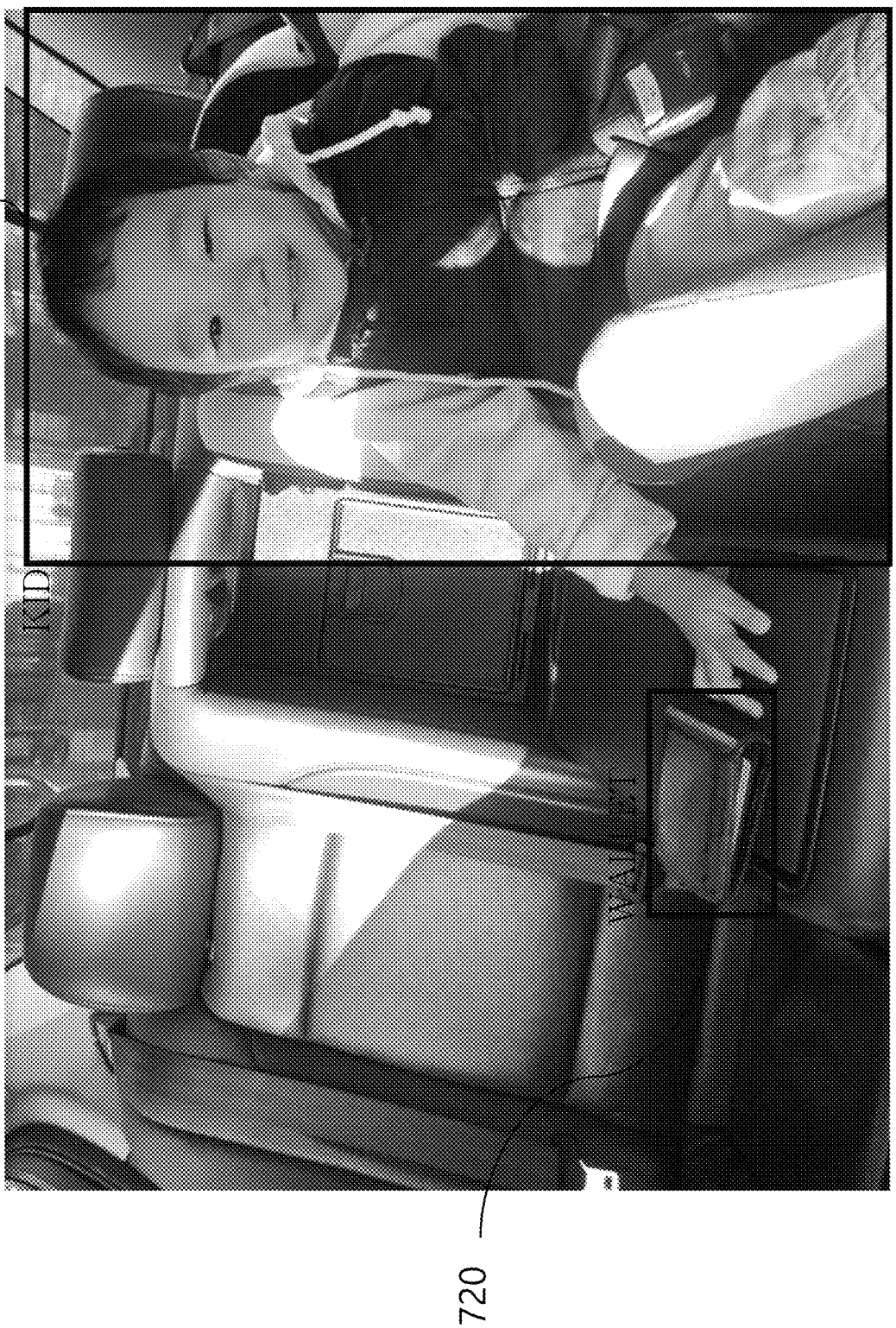
FIG. 7 is a diagram for illustrating a method for monitoring an object and a pet by utilizing a back seat camera according to an embodiment of the present disclosure.

FIG. 7 is a diagram for illustrating a method for monitoring an object and a pet by utilizing a back seat camera according to an embodiment of the present disclosure.

In the above description, it has been assumed that the image filmed by the back seat camera is the behavior of the back seat occupant such as the infants, but the present disclosure is not necessarily limited thereto. A function of additionally monitoring an object, a pet, and the like in the back seat via the back seat camera may be provided.

For example, as shown in FIG. 7, an area of an infant 710 who is the back seat occupant and an area of an object 720 located in the back seat in the image filmed by the back seat camera may be recognized. Therefore, when the driver wants to identify whether a specific object (e.g., a wallet) is located in the back seat while driving, the object located in the back seat may be identified by highlighting the recognized object as shown in FIG. 7. In addition, in order to minimize the distraction during the driving, the identification of the object may be guided to the driver via voice.

In addition, when the pet is located in the back seat, a behavior of the pet may be monitored by applying the above-described embodiments as it is, and postures of the back seat occupant and the pet may be monitored and notification may be provided via the AR-HUD.

Figure 8:
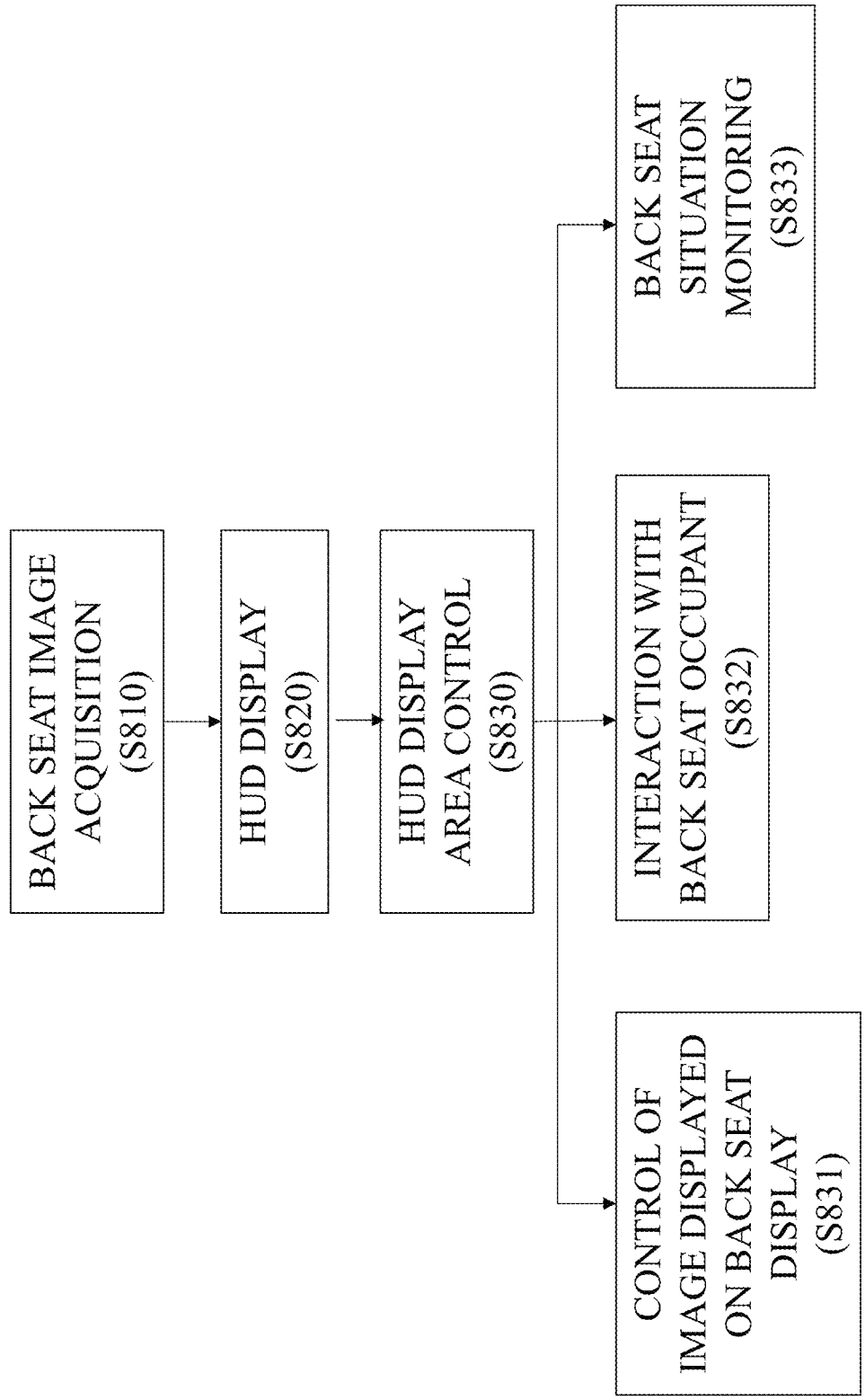
FIG. 8 is a diagram for illustrating a HUD-based in-transporter back seat monitoring method according to an embodiment of the present disclosure.

FIG. 8 is a diagram for illustrating a HUD-based in-transporter back seat monitoring method according to an embodiment of the present disclosure.

As described above, the back seat monitoring method according to the present embodiment first acquires the back seat image containing the back seat occupant via the camera mounted on the back seat of the transporter (S810). It is assumed that the back seat image is the image of the back seat occupant such as the infant, but the present disclosure is not necessarily limited thereto. As described above with reference to FIG. 7, the images of the pet and the object in the back seat may be included.

Therefore, the at least one monitoring information selected by the user among the image information displayed on the back seat display mounted on the back seat of the transporter, the above-described back seat image, and the control information for the image displayed on the back seat display may be displayed on the HUD (S820). It is preferable that the HUD is the AR-HUD and it is preferable that such display information is displayed as AR information that minimizes the obstruction of the driving, unlike image display for image watching.

In addition, the zoom-in or the zoom-out of the first area where the monitoring information displayed by the HUD is displayed is performed, and it is preferable that the first area is controlled so as not to overlap the second area where the driving control information displayed by the HUD is displayed (S830).

The control of the image displayed on the back seat display may be efficiently performed while driving via the information displayed as such as shown in FIG. 8 (S831), and the driver and the infant may communicate with each other while identifying the behavior of each other in response to the specific voice of the back seat occupant as described above in relation to FIG. 6 (S832). In addition, not only the monitoring of the back seat occupant, but also the monitoring of the object and the pet may be performed (S833), and for example, whether there is a specific object in the back seat may be efficiently identified during the travel.

The system and the method for monitoring the back seat in the transporter according to the embodiments of the present disclosure as described above may be utilized for the driver who is with the infant to provide convenience, and may also be utilized for the pet, object management, and the like according to the embodiment.

Described above is a system that efficiently displays information related to an occupant such as infants via an augmented reality head up display (AR-HUD) without distracting a driver for travel safety, and a method using the same.

In addition, the system described above may efficiently control a content of a back seat display while driving and efficiently perform communication with an occupant located in the back seat, recognition of an object and a pet, and the like, and a method using the same.

In addition, the system described above may monitor the occupant such as the infants may be efficiently performed while ensuring the travel safety without distracting the driver.

In addition, the content of the back seat display may be efficiently controlled while driving, and the communication with the occupant located in the back seat, the recognition of the object and the pet, and the like may be efficiently performed.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

Therefore, the scope of the disclosure is defined not by the detailed description, but by the claims and their equivalents, and all variations within the scope of the claims and their equivalents are to be construed as being included in the disclosure.

What is claimed is:

1. An apparatus for monitoring a back seat in a transporter, the apparatus comprising:
    a camera and a back seat display mounted on the back seat of the transporter;
    a head up display (HUD) configured to display any one or any combination of monitoring information selected by a user from among image information displayed on the back seat display, image information filmed by the camera, and control information for an image displayed on the back seat display; and
    a processor configured to
        transmit and receive a control signal between the camera, the back seat display, and the HUD, and
        control zoom-in or zoom-out of a first area of the HUD where the monitoring information is displayed to not overlap a second area where driving control information is displayed by the HUD,
    wherein the image information displayed on the back seat display comprises any one or any combination of an image content displayed on the back seat display, a reproduction time of the image content, and a number or a reproduction time of image contents reproduced on the back seat display after a point in time.

2. The apparatus of claim 1, wherein the HUD is an augmented reality HUD (AR-HUD),
    wherein a brightness and a color of the any one or any combination of monitoring information is controlled to minimize an effect on monitoring of a front situation.

3. The apparatus of claim 1, wherein the processor is further configured to control the control information for the image displayed on the back seat display to be displayed on the HUD based on a preset criterion of the user, in response to the image displayed on the back seat display corresponding to a category,
    wherein the control information for the image displayed on the back seat display comprises control information for identifying any one or any combination of reproduction, stop, and next content reproduction of an image content waiting to be displayed on the back seat display.

4. The apparatus of claim 1, wherein the processor is further configured to control a notification to be provided as the control information for the image displayed on the back seat display, in response to the number or the total reproduction time of image contents reproduced on the back seat display exceeds a threshold.

5. The apparatus of claim 1, wherein the image information filmed by the camera comprises any one or any combination of determination result information based on a heart rate, a body temperature, and a posture of a back seat occupant along with an image of the back seat occupant.

6. The apparatus of claim 5, wherein the image information filmed by the camera additionally contains image information of at least one of an object and a pet located in the back seat,
wherein the processor is further configured to highlight an image area of the object or the pet recognized by the camera based on an input of the user.

7. The apparatus of claim 1, further comprising:
a voice sensor mounted on the back seat of the transporter; and
a front camera mounted at a position to film an image of a driver of the transporter,
wherein the processor is further configured to control the image of the driver to be displayed on the back seat display in response to a specific voice recognized by the voice sensor.

8. A processor-implemented method for monitoring a back seat in a transporter, the method comprising:
acquiring, via a camera mounted on the back seat of the transporter, a back seat image containing a back seat occupant;
displaying, on a head up display (HUD), any one or any combination of monitoring information selected by a user from among image information displayed on a back seat display mounted on the back seat of the transporter, the back seat image, and control information for an image displayed on the back seat display; and
performing zoom-in or zoom-out of a first area where the monitoring information is displayed on the HUD to not overlap a second area where driving control information is displayed on the HUD,
wherein the image information displayed on the back seat display comprises any one or any combination of an image content being displayed on the back seat display, a reproduction time of the image content, and a number or a reproduction time of image contents reproduced on the back seat display after a point in time.

9. The method of claim 8, wherein the HUD is an augmented reality HUD (AR-HUD),
wherein a brightness and a color of the any one or any combination of monitoring information is controlled to minimize an effect on monitoring of a front situation.

10. The method of claim 8, further comprising:
controlling the control information for the image displayed on the back seat display to be displayed on the HUD, in response to the image displayed on the back seat display corresponding to a category specified by the user,
wherein the control information for the image displayed on the back seat display comprises control information for identifying any one or any combination of reproduction, stop, and next content reproduction of an image content waiting to be displayed on the back seat display.

11. The method of claim 10, further comprising:
providing a notification as the control information for the image displayed on the back seat display, in response to the number or the total reproduction time of image contents reproduced on the back seat display exceeding a threshold specified by the user.

12. The method of claim 8, wherein the image information filmed by the camera comprises any one or any combination of determination result information based on a heart rate, a body temperature, and a posture of the back seat occupant along with an image of the back seat occupant.

13. The method of claim 12, wherein the image information filmed by the camera additionally contains image information of at least one of an object and a pet located in the back seat,
wherein the method further comprises:
highlighting an image area of the object or the pet recognized by the camera based on an input of the user.

14. The method of claim 8, further comprising displaying an image of a driver on the back seat display in response to a voice being recognized by a voice sensor mounted on the back seat of the transporter.

* * * * *